March 15, 1966
A. R. CUNNINGHAM
3,240,169
PELLETING MACHINE
Filed Feb. 20, 1961
6 Sheets-Sheet 1
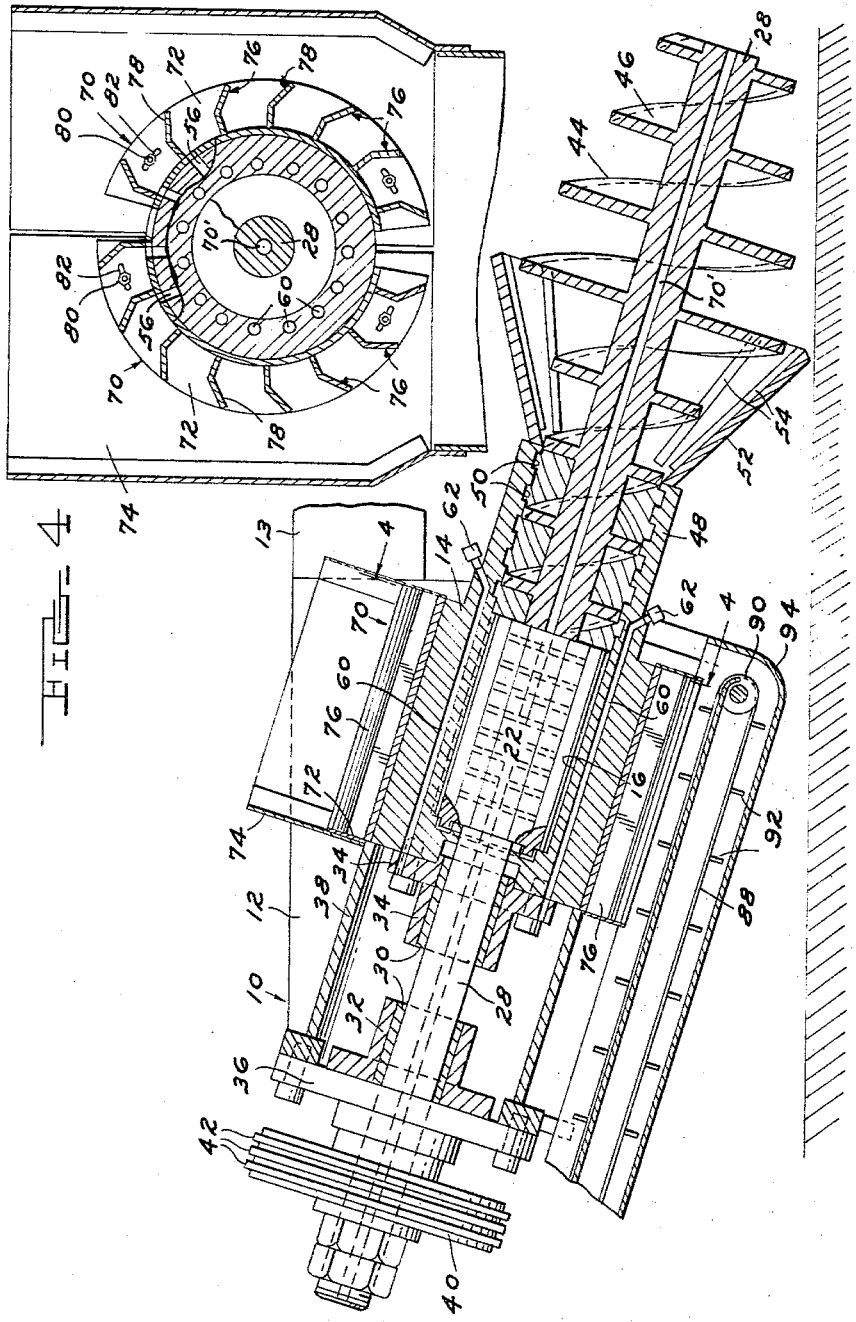
INVENTOR.
ARTHUR RAYMOND CUNNINGHAM
BY
Whittemore, Hulbert & Belknap
ATTORNEYS March 15, 1966    A. R. CUNNINGHAM    3,240,169
PELLETING MACHINE
Filed Feb. 20, 1961    6 Sheets-Sheet 2
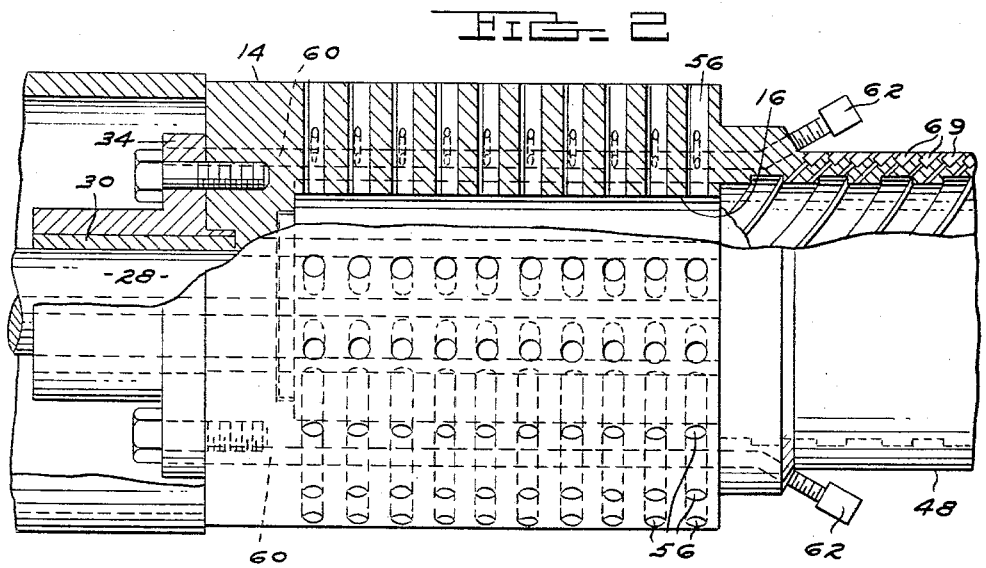
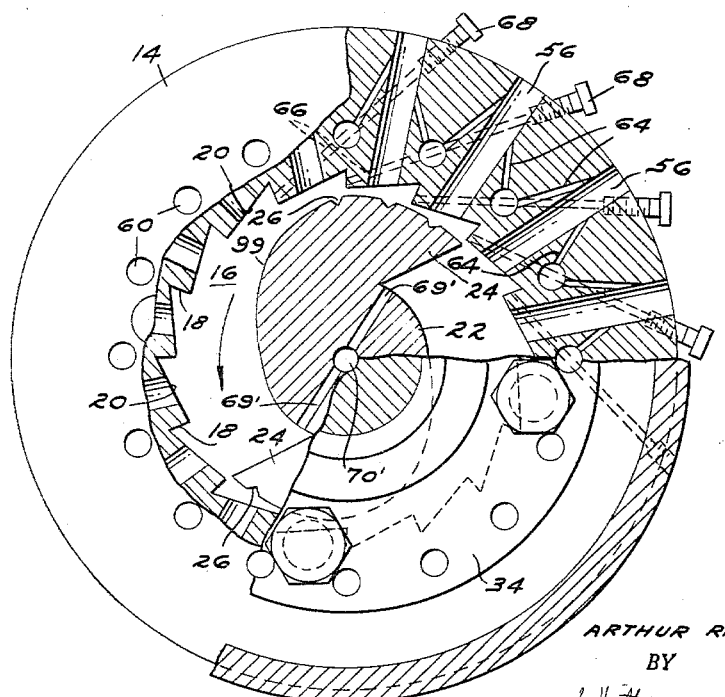
INVENTOR.
ARTHUR RAYMOND CUNNINGHAM
BY
Whittemore, Hulbert & Belknap
ATTORNEYS March 15, 1966 A. R. CUNNINGHAM 3,240,169
PELLETING MACHINE
Filed Feb. 20, 1961 6 Sheets-Sheet 3
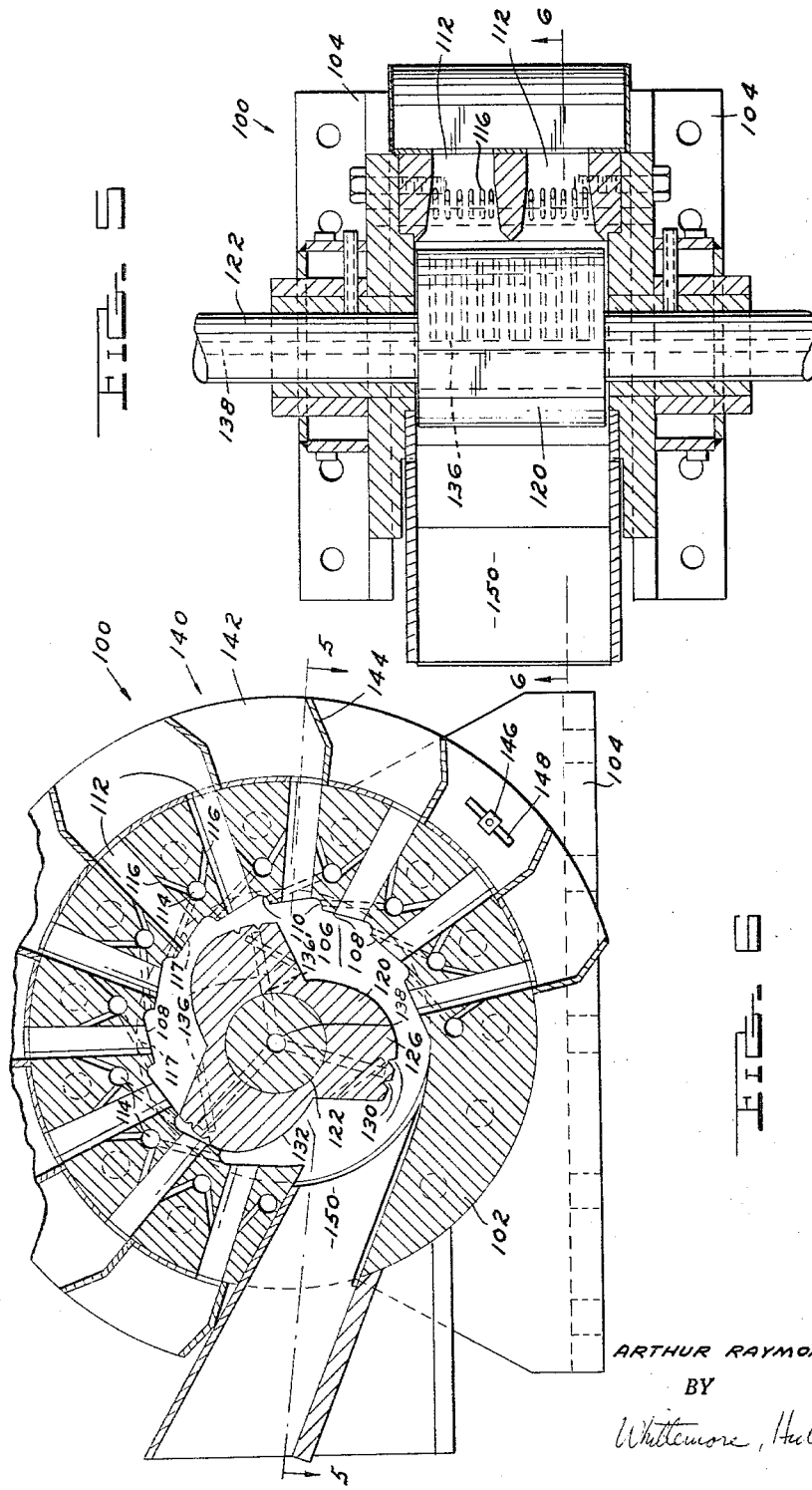
INVENTOR.
ARTHUR RAYMOND CUNNINGHAM
BY
Whittemore, Hulbert & Belknap
ATTORNEYS March 15, 1966   A. R. CUNNINGHAM   3,240,169
PELLETING MACHINE
Filed Feb. 20, 1961   6 Sheets-Sheet 4
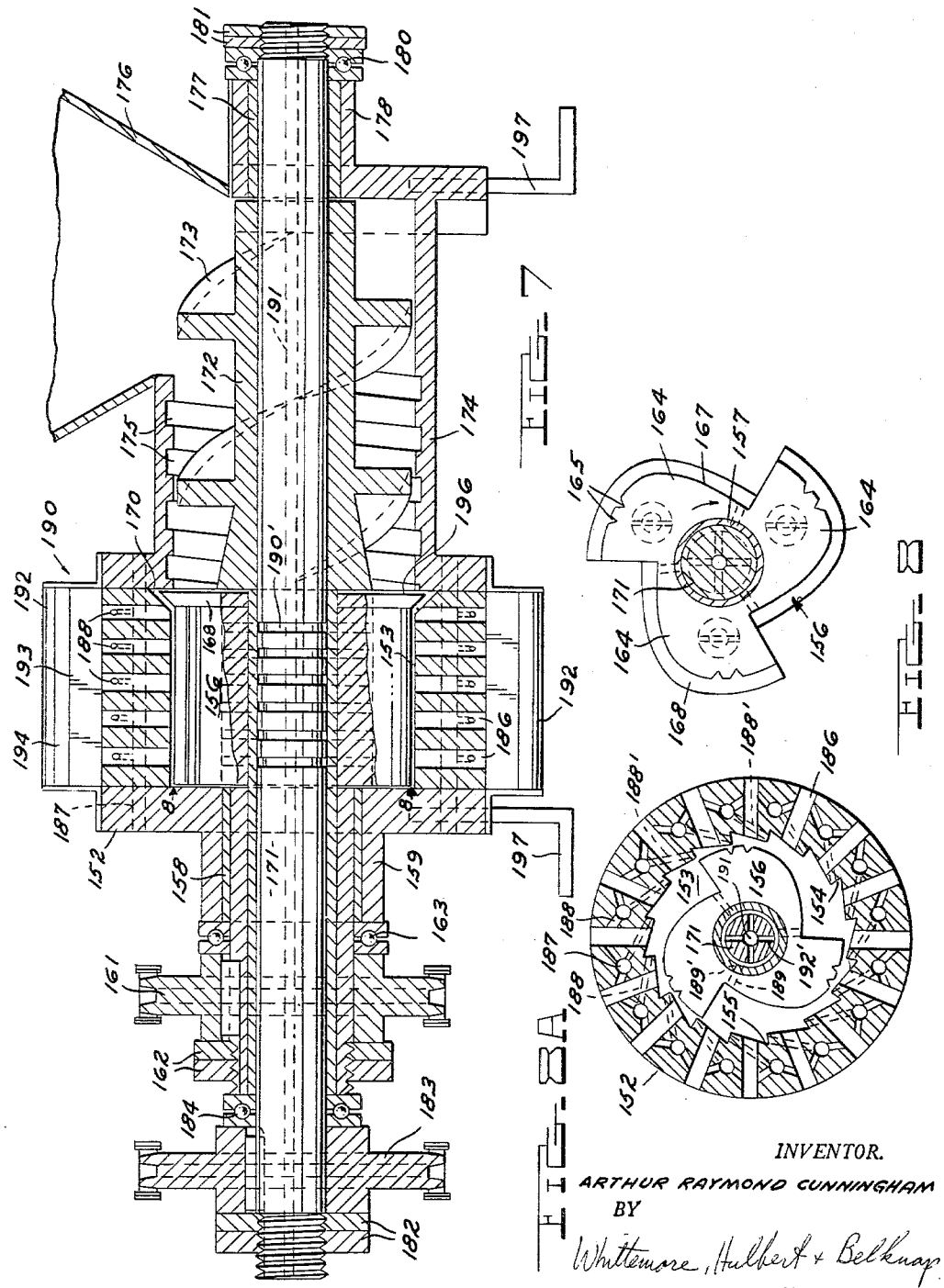
INVENTOR.
ARTHUR RAYMOND CUNNINGHAM
BY
Whittemore, Hulbert & Belknap
ATTORNEYS

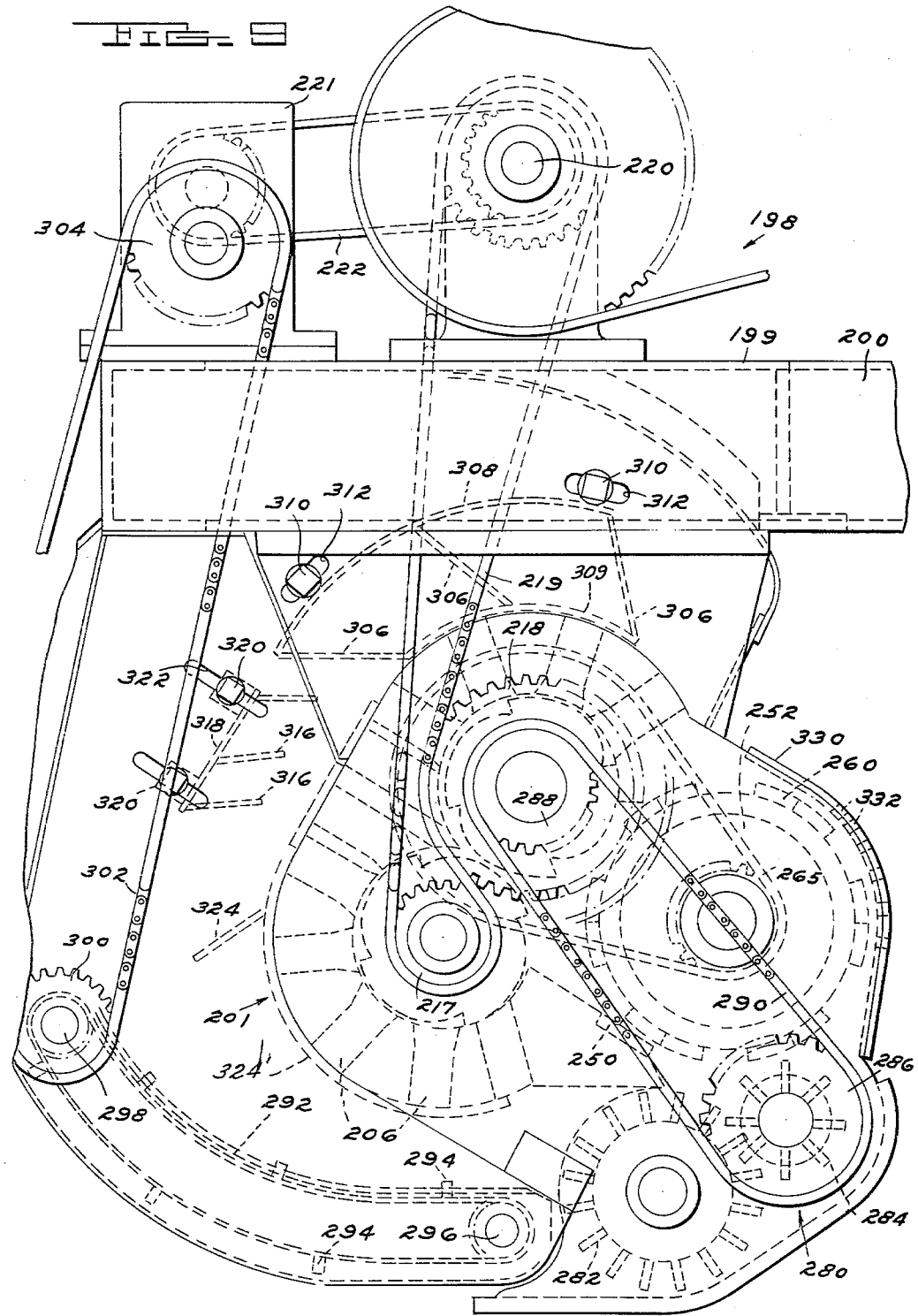

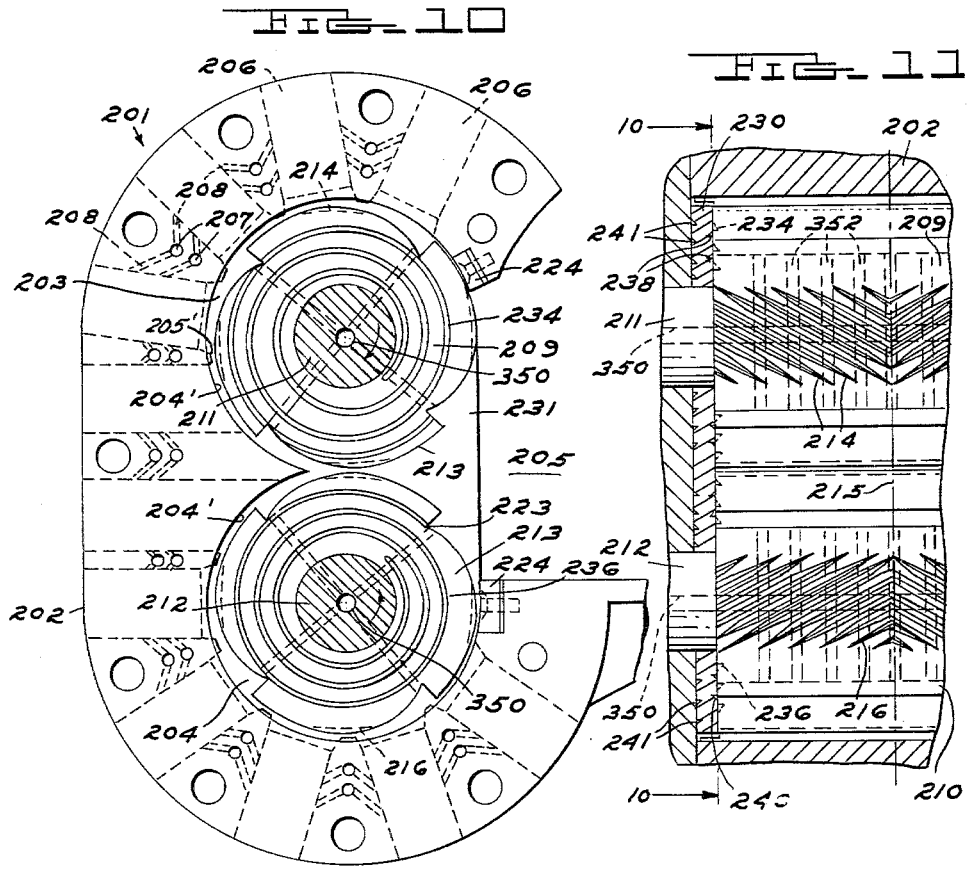
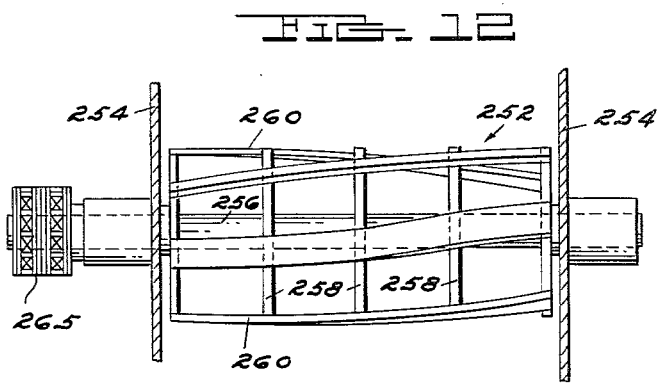
INVENTOR.
ARTHUR RAYMOND CUNNINGHAM
BY
Whittemore, Hulbert & Belknap
ATTORNEYS United States Patent Office 3,240,169
Patented Mar. 15, 1966

3,240,169
PELLETING MACHINE
Arthur Raymond Cunningham, Chicago, Ill.; Thomas W. Cunningham and The First National Bank of Leesburg, executors of said Arthur Raymond Cunningham, deceased
Filed Feb. 20, 1961, Ser. No. 90,312
26 Claims. (Cl. 107—14)

This invention relates generally to a pelleting machine and refers more particularly to a machine for compressing a cut crop and forming the same into dense pellets.

A cut crop, such as hay for example, is much more conveniently handled in a compressed, densified form. Not only is handling easier but less storage space is required. Accordingly, an essential object of this invention is to provide a machine of relative simple construction and high efficiency which is adapted to receive the cut crop and to compress the same into a dense pellet or wafer form of a size which is easily handled and readily stored.

Another object of the invention is to provide a machine for compressing and pelleting a cut crop comprising a chamber having a crop inlet and having restricted outlets in a wall of the chamber, and a rotor mounted in the chamber for rotation having a peripheral portion adapted to sweep along the wall of the chamber past the outlets therein during rotation to press the crop from the chamber through the outlets.

Another object of the invention is to provide a machine wherein the rotor is formed with one or more vanes each having toothlike formations in its periphery which closely approach the wall of the chamber to shred the crop as it is compressed.

Another object is to provide an adjustable means for breaking off the formed pellets from the chamber outlets at the desired length.

Another object of the invention is to provide a machine for compressing and pelleting a cut crop wherein the rotor axis is eccentric with respect to the chamber wall so that the vanes move in a circular path nearer the chamber wall at one side thereof than at the other. Accordingly the crop is distributed more evenly to the various outlets.

Another object of the invention is to provide a machine wherein the chamber is formed to provide a pair of communicating sub-chambers with rotors mounted in the respective sub-chambers to compress the cut crop through outlets in the walls of the sub-chambers, and wherein the rotors closely approach one another in an open region between the sub-chambers and cooperate to grind or shred the crop therebetween.

Another object is to provide a machine as described in the preceding paragraph wherein the rotors are driven at different peripheral speeds to facilitate the grinding and shredding action.

Another object is to provide grooves or tooth-like formations in the peripheries of the rotors, the grooves having the same inclination so as to register where they approach.

Another object of the invention is to provide means for preventing the cut crop from working its way along the ends of the rotors into the bearings.

Another object is to provide a pelleting machine having means for venting the moisture and steam which is squeezed from the crop material when compressed.

Other objects and features of the invention will become apparent as the description proceeds, especially when taken in conjunction with the accompanying drawings, wherein:

FIGURE 1 is a fragmentary longitudinal sectional view of a pelleting machine embodying my invention.

FIGURE 2 is an enlarged fragmentary view, partly in section, of the structure shown in FIG. 1, the means for determining the lengths of the pellets being omitted for clarity.

FIGURE 3 is a transverse view, partly in section, of the structure shown in FIG. 2.

FIGURE 4 is a transverse view on line 4—4 of FIG. 1, with the front portion of the hopper surrounding the pelleter broken away to show the means for breaking the pellets at the desired length.

FIGURE 5 is a sectional view of a modification, taken on the line 5—5 of FIG. 6.

FIGURE 6 is a sectional view of the structure shown in FIG. 5 taken on line 6—6 of FIG. 5.

FIGURE 7 is a longitudinal sectional view of a further modification.

FIGURE 8 is a view taken on the line 8—8 of FIGURE 7.

FIGURE 8a is a sectional view through the pelleting chamber.

FIGURE 9 is an elevational view of another modification.

FIGURE 10 is an enlarged view of a portion of FIGURE 9 taken on line 10—10 of FIG. 11.

FIGURE 11 is a fragmentary sectional view of the structure shown in FIG. 10, viewed from the right.

FIGURE 12 is a view of the chopper roll shown in FIGURE 9.

Referring now to FIGURES 1-4, the pelleting machine therein illustrated is generally indicated at 10 and, as shown in FIGURE 1, is adapted to be moved in a forward direction, that is to the right, by a suitable field vehicle. The machine has a frame 12 provided with a forwardly extending portion 13 adapted to be hitched to the vehicle and towed.

The machine 10 has a housing 14 provided with a generally cylindrical chamber 16. In cross-section, the chamber has the outline shown in FIG. 3 provided with circumferentially spaced, longitudinally extending, radial walls 18 separated by the walls 20. Each wall 20 extends circumferentially from the radially inner edge of one wall 18 to the radially outer edge of the other. The radially inner edges of the walls 18 lie on an imaginary cylinder of uniform circular cross-section.

A rotor 22 is disposed within the cylinder and its axis of rotation is coincident with the center line of the cylinder. The rotor 22 is formed with a pair of integral diametrically opposite vanes 24 which are of the shape illustrated in FIG. 3 from one end of the rotor to the other. The outer surfaces of the vanes are formed with circumferentially spaced, longitudinally extending grooves 26 which extend from one end of the rotor to the other.

The rotor 22 is fixedly secured on a shaft 28 supported for rotation in bushings 30 carried by the journal members 32 and 34. Member 34 is secured to the housing 14 and member 32 is secured to the end plate 36 carried by the tubular housing extension 38. The shaft 28 carries a grooved wheel 40 on its rear end driven from a suitable source of power by the belts 42 engaging the grooves in the periphery of the wheel.

The front end portion of the shaft 28 constitutes a portion of the auger 44 which is completed by the spiral rib or thread 46 thereon. At its forward end the auger is of relatively small diameter, increasing to a somewhat larger diameter near its mid-point and then again decreasing until it becomes a uniform diameter within the front housing extension 48. The front housing extension is tubular, and the cylindrical interior surface thereof, which is concentric with the chamber 16 and closely embraces the threads of the auger, is formed with spiral grooves 50 of a hand opposite to that of the auger.

The housing extension 48 for the auger has a flaring inlet 52 formed with longitudinally extending grooves 54.

The housing proper 14 surrounding chamber 16 is formed with a plurality of circumferentially spaced rows of axially aligned, restricted outlets 56. The outlets 56 in each row extend radially, are spaced apart axially, and at their inner ends open into the chamber through a wall 20 thereof. Between adjacent rows of outlets 56, the axially extending vent passages 60 are provided. Passages 60 are closed at their forward ends by plugs 62 and open at their rearward ends into the interior of the rearward extension 38 through registering holes in the journal member 34. Each longitudinal passage 60 communicates with the outlets 56 of the rows on either side thereof by way of the vents 64. Additional vents 66 extending from the walls 18 of the chamber communicate with the vents 60, being closed at their outer ends by plugs 68. Vents 69 are also provided in the housing extension 48. Radial vents 69' in the auger are spaced apart lengthwise thereof and open at the low points adjacent the vanes. These vents communicate with the longitudinal through passage 70' in the shaft 28.

As the pellets are formed, they are extruded radially outwardly through the outlets 56, and the semicircular members 70 are provided for determining the length of the pellets. The members 70 are disposed on opposite sides of housing 14 within a hopper-like container 74 which surrounds the housing and is secured thereto. These members are omitted from FIGS. 2 and 3 for clarity of illustration. Each member 70 includes an approximately semi-circular ring 72 and a plurality of axially extending, circumferentially spaced baffles 76 which are of the angular cross-section shown in FIG. 4. The spacing between the baffles 76 corresponds to the spacing between the rows of outlets so that each baffle serves a row of outlets and extends for the full length thereof. Pellets extruded from a row of outlets will be deflected by the inclined outer portion 78 of the associated baffle and thereby broken off at a predetermined length. The members 70 may be rotated slightly in one direction or the other to obtain longer or shorter pellets. For this purpose, bolts 80 carried by the rear wall of the hopper 74 extend through arcuate slots 82 in the rings 72, being slidably received therein, to facilitate adjustment of the members 70. A nut on the end of each bolt serves to clamp the member in the desired position of rotation. Obviously, if desired, the baffles may be manually bent to the desired form to change the length of the pellets without the necessity of the adjustment afforded by bolts 80 and slots 82.

The hopper 74 is in effect a collector for pellets produced by the machine, being open at the bottom to discharge the pellets onto a conveyor belt 88 which moves counter-clockwise so that pellets received by the top run thereof may be conveyed to a wagon behind the machine. The front end of the belt 88 is trained over a roll 90 and the rear end thereof is trained over a similar roll, not shown, one of the rolls being driven by a suitable source of power. Radial impellers 92 are spaced apart along the length of the conveyor belt 88 to facilitate the transfer of the pellets, and the conveyor is housed in a casing 94 depending from housing 14.

In operation, the shaft is rotated in a direction to cause the rotor to turn in the direction of the arrow in FIG. 3 which produces a rotation of the auger 44 in a direction to feed crop cuttings laying on the ground rearwardly into the housing chamber 16. Since the rotor and auger are rigidly carried by the shaft, they of course rotate as a unit. The cuttings first enter the flared inlet 52 and are then compressed and compacted somewhat as they move into the cylindrical housing extension 48. The action of the auger in cooperation with the grooved inlet 52 and grooved housing extension 48 has a shredding action on the crop tending to crack and break up the stems to shorter lengths. The grooves 50, being of an opposite hand to that of the auger, have a greater shredding action than they would have if of the same hand.

The cuttings are moved into the chamber 16 by the continued rotation of shaft 28 where they are forced radially outwardly by the vanes of rotor 22. The grooved portion of the radially outer periphery of each vane is generally circular, being concentric with the chamber, and then the portion thereof extending to the other vane is of gradually smaller radius, this portion of gradually smaller radius being indicated by reference numeral 99. These peripheral portions of the rotor vanes have a camming action on the crop, pressing it under ever-increasing pressure to the radially outer wall of the chamber 16, the circular grooved portions of the vanes finally pressing the crop in a very dense form into the rows of outlets 56. Continued rotation of the rotor builds up layers of crop material within the outlets until the pelleted material extrudes beyond the outlets and is eventually broken off by the baffles 76 dropping to the conveyor belt 88.

Moisture which is removed from the crop as it is compressed may escape through the vents 69 in the housing extension 48 and through the vents 60, 64 and 66 in the housing proper 14. The vents 64 are inclined away from the movement of the pellets in the outlets so that the pelleted material will not move into the vents. The shape of the walls 18 through which the inner ends of the vents 66 extend is such that the compressed material will not move into these vents. Moisture collected by the vents 60 may be discharged into the tubular extension 38. Moisture is also vented through passages 69' and 70', the outer ends of passages 69' being located so that the crop material will not enter.

The rotor grooves 26 define tooth-like formations which, in cooperation with the chamber wall, have a further shredding action on the crop as it is compressed, breaking it up into small particles.

FIGURES 5 and 6 disclose a modified form of pelleter which is stationary. The pelleter there shown is indicated generally at 100 and has a housing 102 formed with mounting brackets 104 whereby the pelleter may be mounted in fixed position at any desired location. The housing defines an internal chamber 106, the arcuate wall of which is defined by longitudinally extending, circumferentially spaced, flat surfaces 108 which extend from end to end of the chamber and in cross-section are inclined as illustrated in FIG. 6. The surfaces 108 are joined by arcuate surfaces 110. The housing is formed with circumferentially spaced rows of axially spaced outlets 112. The rows extend longitudinally of the casing and the inner ends of the outlets in each row open into the chamber 106 through a wall 108 thereof.

Longitudinal vent passages 114 extend between the rows of outlets, being open at either end of the casing. Vents 116 extend from each vent passage 114 to the outlets 112 of the rows on both sides of the vent passage to provide communication therebetween. Vents 117 communicate with the passages 114 and open into the chamber through the arcuate surfaces 110.

A rotor 120 is disposed within the chamber 106, being keyed to the shaft 122. The axis of rotation of the rotor, which is the center of shaft 122, is parallel to but laterally offset from the center of the chamber, which center is defined as the center of an imaginary circle drawn through the radially inner edges of the arcuate walls 110. The rotor 120 has the three vanes 126 spaced 120° apart, which are of the cross-section shown in FIG. 6 from one end of the rotor to the other. The outer surfaces of the vanes are generally circular and concentric with the axis of rotation of the rotor, having longitudinal grooves 130 therein. The circular portion of each vane merges with a portion 132 thereof of gradually decreasing radius which extends to the next vane to gradually force the crop material radially outwardly upon operation of the rotor in a counter-clockwise direction. Vent passages 136 in the rotor communicate with vent passages 136' in the rotor and in shaft 122, and vent passages 136′ communicate with the axial passage 138 in the shaft to dispose of the moisture squeezed from the crop.

The length of the pellets is determined by the cut-off structure 140 composed of a ring 142 carrying the axially extending angular baffles 144, spaced apart circumferentially a distance corresponding to the spacing between the rows of outlets. The extruded pellets are broken off at the desired length by engagement with the angled outer ends of the baffles. The cut-off structure may be rotated with respect to the casing and locked in adjusted position to vary the length of the pellets, by means of bolts 146 carried by brackets 104 which extend through arcuate slots 148 in ring 142, nuts being threaded on the bolts to secure the structure in the desired position. The baffles may be individually bent to effect an adjustment, as in the embodiment first described.

The casing is provided with an inlet 150 to the chamber by means of which the cut crop can be fed into the chamber 106 during the counterclockwise rotation of the rotor. The material is forced radially outwardly and compressed within the outlets 112, the material building up in layers within the outlets and eventually extruding from the outlets to be broken off by the baffles and discharged to any convenient receiver, not shown. Since the rotor 120 is eccentric, the vanes thereof sweep closer to the wall of the chamber along one side thereof than the opposite side, providing a more even distribution of the crop to the rows of outlets 112. The events 116 are inclined with respect to the outlets 112, and the vents 117 and 136 open into the chamber in a direction such that the crop material is not forced into the vents during operation.

FIGURES 7 and 8 show another modification of the machine embodying the invention. The pelleting machine there illustrated comprises a housing 152 provided with a generally cylindrical chamber 153. In cross section, the chamber has the outlined from end to end shown in FIGURE 8A provided with circumferentially spaced, longitudinally extending radial walls 154 separated by the walls 155. Each wall 155 extends circumferentially from the radially inner edge of one wall 154 to the radially outer edge of the other. The radially inner edges of the walls 154 lie on an imaginary cylinder of uniform circular cross section.

A rotor 156 is disposed within the cylinder and its axis of rotation is coincident with the center line of the cylinder. The axis of rotation of the rotor is the center of the tubular shaft 157 upon which the rotor is rigidly mounted, the shaft 157 being rotatably supported by a bearing 158 carried by the housing extension 159. The tubular shaft 157 is keyed to a pulley 161 confined between the nuts 162 threaded on the end of the shaft and a thrust bearing 163.

The rotor is formed with the three equally spaced vanes 164 which are of the shape illustrated in FIGURE 8 from one end of the rootor to the other. The outer peripheries of the vanes are formed with circumferentially spaced, longitudinally extending grooves 165 which extend from end to end of the vanes. The grooved portions of the vane peripheries are cylindrical and concentric with respect to the axis of rotation closely approaching the wall of the cylindrical chamber, and these cylindrical portions of the vane peripheries merge into portions 167 of gradually decreasing radius which connect into the adjacent vanes.

A cutter 168 is rigidly secured to the front end, or right hand end, of the rotor. The cutter is vane shaped, corresponding in outline to the shape of the rotor vanes, as seen in FIGURE 8. The chamber 153 flares at the front end as indicated at 170 to accommodate the flaring contour of the cutter.

A shaft 171 is rotatable within the tubular shaft 157, and the front end portion thereof rigidly supports an auger 172. The thread 173 of the auger is of uniform diameter, only slightly smaller than the diameter of the housing extension 174 within which it rotates. Helical grooves 175 in the inner surface of the housing extension are of a hand opposite that of the auger. A funnel shaped inlet 176 communicates with the housing extension 174 at the front end thereof. A bearing 177 rotatably supports the front end of shaft 171, being secured within an integral portion 178 of the housing extension. A thrust bearing 180 is confined between the integral portion 178 and the nuts 181 threaded on the end of the shaft.

The rear end of shaft 171 has nuts 182 threaded thereon, and a pulley 183 is confined between the nuts and a thrust bearing 184. The pulleys 161 and 183 are provided to rotate the shafts 157 and 171 from a suitable source of power, not shown.

The housing 152 for chamber 153 is formed with a plurality of circumferentially spaced rows of axially aligned restricted outlets 186. The outlets in each row extend radially, are spaced apart axially, and at their inner ends open into the chamber through walls 155 thereof. Between adjacent rows of outlets, the axially extending vent passages 187 are provided which are open at both ends and which communicate with the outlets of the rows on either side thereof by way of vents 188. Moisture is relieved through the vents. Vents 188′ also communicate with the passages 187, opening into the chamber through the walls 154 thereof. The rotor is formed with circumferentially spaced rows of radially extending, axially spaced vents 189 which register with ports 189′ in the tubular shaft 157. The vents 189 and registering ports 189′ of the various rows lying in the same transverse plane register with annular grooves 190′ in the inner shaft 171 and communicate with the central through passage 191 in shaft 171 through radial passages 192′. Hence the moisture pressed from the crop material is relieved by these various passages ultimately through passages 187 and 192. The vents 188 open into the outlets 186 on an incline, and the vents 188′ and 189 open into the chamber in positions such that the crop material is not forced into the vents.

The extruded pellets are broken off at the desired lengths by the cut-off structure 190. The cut-off structure 190 comprises a plurality of baffles 191 equal in number to the number of rows of outlets. The radial portion 193 of each baffle extends outwardly from a point between the rows of outlets and preferably closely adjacent to the row of outlets with which it is associated, and the inclined portion 194 thereof extends across a radial projection of the outlets in the associated row so that pellets extruded from the outlets will be broken off upon engagement with the inclined baffle portions. The baffles extend from end to end of the rows of outlets and may be bent to afford the desired adjustment depending upon the pellet lengths required.

In operation, the tubular shaft 157 and its rotor are rotated in one direction (clockwise in FIG. 8), and the shaft 171 and its auger 172 are rotated in the opposite direction. The thread of the auger advances the cut crop delivered through the inlet 176 in a rearward direction toward the chamber 153. The action of the auger in cooperation with the grooved interior of the housing extension 174 has a shredding action on the crop tending to break it up into short lengths. The cutter 168 has a further shredding action on the crop, its cutting edge being indicated at 196. Since the cutter turns in the opposite direction from that in which the crop tends to rotate by the action of the auger, the shredding action of the cutter is enhanced.

The crop continues to move rearward into the chamber and to be forced radially outwardly by the vanes of rotor 156 toward the surrounding wall of the chamber. The peripheral shape of the vanes presses the material into the outlets in layers, and the compacted layers of material build up and extrude from the outlets to be broken off at desired lengths by the cut-off structure 190. The grooves 165 in the vanes of the rotor have a further shredding action on the crop. This form of the invention is intended to be operated from a stationary position, and accordingly mounting brackets 197 are provided.

FIGURES 9 to 12 show still another modification of the invention.

The pelleter there shown is generally indicated at 198 and is of the mobile type adapted to be advanced in a direction to the right as viewed in FIG. 9. The pelleter has a frame 199 including a forwardly extending portion 200 for attachment to a towing vehicle. The pelleter 198 will, of course, be supported on suitable ground supporting wheels, not shown.

Mounted on the frame is the pelleting apparatus 201 which is better shown in FIG. 10. The apparatus comprises a housing 202 defining a chamber formed to provide a pair of sub-chambers 203 and 204. The sub-chambers are substantially identical, being of generally cylindrical form as illustrated and having parallel axes. Each sub-chamber has an arcuate wall 204' which connects with the wall of the other sub-chamber and which is open at the front end or inlet 205 of the device. The housing is formed with the spaced rows of pellet outlets 206 which at their inner ends open into the arcuate wall of the sub-chambers and at their outer ends are open to the exterior of the housing. Each axially extending row of outlets may contain two or more outlets for example, and the outlets of each row are spaced apart axially with respect to the housing. The circular outline of the arcuate walls 204' is actually interrupted somewhat between the rows of openings by the raised ribs 205' which extend somewhat inside the circular outline thereof. The casing is formed between the rows of outlets with axial vent passages 207 which are open at either end of the housing and communicate with the adjacent outlets by vents 208.

A rotor 209 is located in the upper sub-chamber and a rotor 210 is located in the lower sub-chamber. These rotors are fixed on parallel shafts 211 and 212 which are journaled in the housing 202. Each rotor is formed with the four vanes 213 which are spaced apart 90° as shown. The peripheral surfaces of the vanes extend from their tips in a circle or cylinder concentric with the axis of rotation for a portion of their length and then merge into a section of gradually smaller radius which connects into the base of the adjacent vane. Each vane is provided in its outer surface with inclined parallel grooves 214 which in the overall view are generally V-shaped, that is to one side of the center line of the roll, the grooves incline in one direction and at the other side they incline in the opposite direction, the center line at the apex of the V being indicated at 215. The grooves in each vane of the rotor 209 are exactly as shown in FIG. 11 and extend from one end thereof to the other. The grooves in each vane are, of course, slanted in the same direction so that if the rotor 209 were rotated to present any of the other vanes for full view, as in FIG. 11, the grooves thereof would appear exactly as illustrated. The merger between the cylindrical surface portion of each vane and the portion thereof which is of gradually smaller radius occurs approximately at the mid-point of the grooves.

The other rotor 210 will be seen in FIGS. 10 and 11 to be a mirror image of rotor 209. The grooves 216 in the vanes of rotor 210 are exactly the same as the grooves 214 but of the opposite inclination. Thus the grooves are such that, as viewed in FIG. 10, those on the lowermost vane of the upper rotor and those on the uppermost vane of the lower rotor are in exact register with one another. The registering grooves are inclined in the same direction. The other grooves in the vanes of the lower roll are exactly like the grooves 216 and would appear exactly as in FIG. 11 if the lower roll were rotated to present the grooves of the other vanes for full view. Actually these rotors are identical except one is reversed end for end.

The rotors 209 and 210 are driven at different speeds and in opposite directions. Referring to FIG. 9, the lower rotor has a small gear 217 and the upper rotor has a large gear 218, both of which are driven by the chain 219 from a gear on the shaft 220 which is driven by a motor 221 from a chain 222 to another gear thereon. The small gear 217 has half as many teeth as the large gear 218 so that the lower rotor is driven twice as fast as the upper rotor. Hence the rotors, being of the same diameter and hence operating at different peripheral speeds, will have a shredding action on the crop in the region between the rotors. The grooves of one rotor will move relative to the registering grooves of the other rotor to shear and shred the crop material therebetween. Moreover, there will never be a time when the recessed space between vanes at the four low points in the rotor peripheries, designated 223, will match up or register with each other in the region of nearest approach between the rotors. Starting in the relative position shown, the 2 to 1 speed ratio assures this. This is desirable because as the crop material is drawn between the rotors and into the sub-chambers, a substantial pressure is imposed on the crop material which could backfire or blow out of the housing through the inlet if the low points 223 of the two rotors ever were to match up at the point on a line between the axes of rotation thereof. The grooves 214 and 216 define tooth-like formations providing in effect serrations which also have a shredding action on the crop between each rotor and its chamber wall.

It will be noted that the axes of the rotors, while parallel to the centers of the arcuate surfaces 204' of the sub-chambers, are laterally offset therefrom so that at the inlet between the rotors the sub-chambers are spaced substantially therefrom, whereas at the opposite ends of the arcuate walls a minimum spacing is provided. Hence the crop is distributed more evenly between the rows of outlets during operation, it being understood that the upper rotor turns clockwise.

Along the portion of each sub-chamber wall closest to the associated rotor, an adjustable wear bar 224 is provided for contact or approximate contact with the vanes of the rotor. Bolts are provided to secure the bars in position and shims may be inserted to vary the radial positions of the bars. As the bars wear or as the rotor vanes wear, adjustments may be made by the insertion of additional shims as required.

Wear plates 230 and 231 are provided between the housing and each end of the rotors. One end of the rotor 209 has a spiral groove 234 therein and the corresponding end of the other rotor has a spiral groove 236. The wear plate 230 has a spiral groove 238 which is of the same hand as the groove 234, that is if these were viewed from the left in FIG. 11 they would appear to be of the same hand. Likewise, when viewed in the same manner, the spiral groove 240 in the wear plate opposite groove 236 of the lower rotor is of the same hand as groove 236. Rotation of the rotors 209 and 210 in the directions indicated tends to urge in a radially outward direction any crop material which may find its way between the rotor and wear plate 230 by the action of the inclined grooves 234 and 238. The same may be said for grooves 236 and 240. Crop material may fill these grooves and act as a seal against the movement of crop material radially inwardly toward the bearings. Circular grooves 241 formed in the wear plate surround each of the shafts 211 and 212.

The opposite end of rotor 209 is formed with a groove similar to the groove 234 which is spiral and, as viewed in FIG. 10, would lie precisely behind and be covered throughout its length by the groove 234. Similarly, the opposite end of the lower rotor has a spiral grove in its other end which would be precisely covered by the groove 236, as viewed in FIG. 10 Obviously, if viewed from the other side of the housing, the grooves in the opposite ends of the rotors would be of a hand opposite that of grooves 234 and 236. Accordingly, the spiral grooves on both ends of the rotors are such that they tend to force any material radially outwardly as the rotors turn. The spiral grooves in the inner surface of wear plate 231, corresponding to spiral grooves 238 and 240, are of the same hand as the grooves in the corresponding end in the associated rotors 209 and 210 respectively. The outer side of the wear plate 231 is formed with circular grooves similar to the grooves 241 encircling the other ends of shafts 211 and 212.

The housing 202 has an extension supporting a cutter bar 250. A chopper roll 252 is carried by frame members 254 and has a shaft 256 parallel to the shafts of the rotors 209 and 210 with axially spaced disks 258 thereon supporting the chopper blades 260. The disks are circular and of the same diameter, and the blades 260 extend across the peripheries of the disks from one end of the rotor to the other, being twisted somewhat as illustrated. The chopper roll is supported adjacent to the cutter bar 250 so that the blades cut across the cutter bar and shred or shear the crop material fed thereto. As viewed in FIG. 9, the chopper roll is rotated in a clockwise direction being driven by a chain 265 trained over gears on the upper pelleting rotor 209 and on the shaft 256.

A conditioner 280 is also provided which is in the form of a pair of parallel rolls, the lower roll having circumferentially spaced, axially extending flutes 282, and the upper roll having circumferentially spaced, axially extending flutes 284. The rolls are mounted for rotation in the frame members 254 and the upper roll has a gear 286 driven from a gear 288 on shaft 211 by a chain 290. The lower roll of the conditioner is turned by interdigitation of the flutes.

A conveyor belt 292 provided with spaced impellers 294 is trained over shafts 296 and 298, the shaft 298 carrying a gear 300 for rotation of the shaft and hence of the conveyor belt by a chain 302 trained over a gear 304 on the motor. The operation is such that the conveyor 292 moves counterclockwise to deliver pellets discharged thereto to the rear of the machine.

A plurality of baffles 306 are connected to an arcuate rod 308 which is adjustable longitudinally to vary the position of the baffles with respect to the associated outlets 206 and hence the length of the pellets extruded therefrom. The rod carries integral bolts 310 which extend through elongated slots 312 in a frame member 254 and nuts are provided to clamp the bolts in adjusted position. The inner ends of the baffles may, if desired, be connected by a member 309. The member 309 is a rod and does not cover outlets 206. Baffles 316 are likewise provided, carried by adjustable rod 318 having integral bolts 320 extending through elongated slots 322 in the frame member 254 so that the bolts may be clamped in adjusted position by suitable nuts to vary the length of the pellets extruded from the associated outlets, and another baffle 324 is provided which likewise may be adjustable. Rod 324′, which does not cover outlets 206, mounts baffle 324. All of these baffles may be adjusted by simply bending them as desired. With reference to FIGURE 9, the pellets issuing from those outlets 206 which are not covered by baffles are broken off by contact with the housing itself or with the conveyor 292.

The frame members 254 are connected by a panel 330 which is formed with vents 332 for the circulation of air.

In operation, the machine is drawn to the right as viewed in FIG. 9, and the cuttings enter the hay conditioner 280 from the lower side. The stems of the cuttings are cracked by the passage between the flutes of the conditioner rolls, the upper roll turning in a clockwise direction and the lower roll in a counterclockwise direction to feed the material to the chopper roll where the stems are sheared and shredded on the cutter bar 250. The shredded crop material is then fed to the pelleting rotors 209 and 210 between the grooved vanes of which it is further shredded or sheared for entry into the sub-chambers and for compression into dense layers of material within the outlets 206. The layers of material build up into pellets which extrude beyond the housing during the continued rotation of the rotors 209 and 210 and are broken off by the baffles and deposited on the conveyor belt for transfer to a suitable container, such as a wagon, either directly or by means of an intermediate conveying device.

Referring again to FIGURE 10, the rotors 209 and 210 are formed with axial through passages 350 communicating with the chambers by way of circumferentially spaced rows of axially spaced, radially extending vents 352 which open through the periphery of each rotor at the low point therein. The vents 208 are inclined relative to the outlets 206, and the vents 352 open through the rotor peripheries at locations such that the crop material is not forced into the vents. The provision of vents in the various forms of the invention described herein is very impotrant. The compression of the crop material by the rotors and augers naturally presses the moisture from the crop material and also generates a considerable amount of heat which may transform some of this moisture to vapor or steam. If provision is not made for venting the moisture and vapor, the pellets are apt to break up and in effect explode. In any event, if the moisture were not removed, it would leave voids in the pellets when evaporated such that even if the pellets were not destroyed by escaping moisture, they would be considerably less compact.

What I claim as my invention is:

1. A machine for compressing and pelleting a cut crop comprising a housing defining a chamber formed to provide a pair of sub-chambers, rotors mounted in said respective sub-chambers for rotation about parallel axes, said sub-chambers having arcuate walls about said rotors and being in open communication with each other in the region between said rotors, the peripheral portions of said rotors closely approaching one another in said open region, a crop inlet to said region between said rotors, restricted outlets in said arcuate walls, the peripheral portions of said rotors being adapted to sweep along said walls past said outlets during rotation to press the crop from said sub-chambers through said outlets, and means for rotating said rotors in opposite directions.

2. The machine defined in claim 1 having means outside said chamber in position to be engaged by pellets from said outlets for breaking off said pellets at desired lengths.

3. The machine defined in claim 1 wherein said rotors have circumferentially spaced vanes the radially outer surfaces of which define the aforesaid periphefiral portions of said rotors, said radially outer surfaces having generally axially extending grooves defining teeth adapted to shred the crop.

4. The machine defined in claim 3 wherein said rotors are positively driven at different peripheral speeds.

5. The machine defined in claim 4 wherein said grooves of each rotor are inclined, the degree and direction of inclination of the grooves of each rotor being the same so that said grooves register in the open region between said rotors and so that said grooves have a shearing action with respect to each other due to their different peripheral speeds.

6. The machine defined in claim 5 wherein the grooves are generally V-shaped with the V pointing in the direction of rotation.

7. The machine defined in claim 1 wherein wear plates are provided confining the opposite ends of each rotor, and wherein the ends of the rotors have spiral grooves therein to entrap material which may work its way along the ends of the rotors.

8. The machine defined in claim 7 wherein spiral grooves are of a hand such that they urge the material radially outwardly upon rotation of the rotors.

9. The machine defined in claim 8 wherein said wear plates have spiral grooves opposed to the ends of said rotors of a hand corresponding to that of the grooves in opposed rotor ends.

10. The machine defined in claim 1 wherein said rotors are eccentrically mounted with respect to said chambers so that the vanes move in a circular path nearer the sub-chamber walls at one side thereof than at the other.

11. The machine defined in claim 10 wherein said sub-chamber walls each have at the point of nearest approach of said vanes a radially adjustably mounted wear plate.

12. The machine defined in claim 1 wherein said housing has a cutter bar near the crop inlet, and a chopper roll cooperable with said cutter bar to chop the crop material and feed it to said inlet.

13. The machine defined in claim 12 wherein a crop conditioner is provided for feeding the crop to the chopper roll, said crop conditioner comprising a pair of fluted interdigitating rolls mounted on parallel axes.

14. The machine defined in claim 1 wherein passage means are provided in said housing communicating with said outlets for venting moisture compressed from the crop.

15. The machine defined in claim 1 wherein passage means are provided in said rotors for venting moisture compressed from the crop.

16. A machine for compressing and pelleting a cut crop comprising a housing defining a chamber formed to provide a pair of sub-chambers, rotors mounted in said respective sub-chambers for rotation about parallel axes, said sub-chambers having arcuate walls about said rotors and being in open communication with each other in the region between said rotors, the peripheral portions of said rotors closely approaching one another in said open region, a crop inlet to said region between said rotors, said housing having restricted passages opening into said sub-chambers through said walls and providing restricted crop outlets from said sub-chambers, the peripheral portions of said rotors being adapted to sweep along said walls past said outlets during rotation to press the crop from said chambers through said passages, and moisture vents in said housing communicating with said passages at points spaced from said sub-chambers, said vents extending from said passages at angles inclined away from the direction of crop movement from said chambers.

17. A machine for compressing and pelleting a cut crop comprising a housing defining a chamber formed to provide a pair of sub-chambers, rotors mounted in said respective sub-chambers for rotation about parallel axes, said sub-chambers having arcuate walls about said rotors and being in open communication with each other in the region between said rotors, the peripheral portions of said rotors closely approaching one another in said open region, a crop inlet to said region between said rotors, restricted outlets in said arcuate walls, said rotors having circumferentially spaced vanes adapted to sweep along said walls past said outlets during rotation to press the crop from said sub-chambers through said outlets, and moisture vents in said rotors between said vanes.

18. A machine for compressing and pelleting a cut crop comprising a housing having a chamber, a rotor mounted in said chamber for rotation, said chamber having a wall about said rotor, a crop inlet to said chamber, said housing having restricted passages opening into said chamber through said wall and providing restricted crop outlets from said chamber, said rotor being adapted to sweep along said wall, past said passages during rotation to press the crop from said chamber through said passages, and moisture vents communicating with said passages.

19. The machine defined in claim 18, wherein said vents communicate with said passages at points spaced from said chamber, said vents extending from said passages at angles inclined away from the direction of crop movement from said chamber.

20. A machine for compressing and pelleting a cut crop comprising means providing a chamber, a rotor mounted in said chamber for rotation, said chamber having a wall extending about said rotor and provided with restricted outlets, a crop inlet to said chamber, the periphery of said rotor being adapted to sweep along said wall past said outlets during rotation to press the crop from said chamber through said outlets, said wall having circumferentially spaced, generally radial surfaces facing in the direction of rotation of said rotor, and moisture vents communicating with said chamber through said generally radial surfaces.

21. A machine for compressing and pelleting a cut crop comprising means providing a chamber, a rotor mounted in said chamber for rotation, said chamber having a wall extending about said rotor and provided with restricted outlets, a crop inlet to said chamber, said rotor having circumferentially spaced vanes adapted to sweep along said wall past said passages during rotation to press the crop from said chamber through said outlets, said vanes being of maximum radius at their leading edges and tapering to a smaller radius in a trailing direction, forming pockets between the points of maximum radius, and moisture vents in said rotor located in said pockets.

22. A machine for compressing and pelleting a cut crop comprising means providing a chamber, a rotor mounted in said chamber for rotation, said chamber having a wall extending about said rotor and provided with restricted outlets, a crop inlet to said chamber, the periphery of said rotor being adapted to sweep along said wall past said outlets during rotation to press the crop from said chamber through said outlets, the ends of said rotor having spiral grooves therein to entrap material which may work its way along the ends of the rotor.

23. The machine defined in claim 22, wherein said spiral grooves are of a hand such that they urge the material radially outwardly upon rotation of the rotor.

24. The machine defined in claim 23, wherein wear plates confine the opposite ends of said rotor, said wear plates having spiral grooves opposed to the ends of said rotors of a hand corresponding to that of the grooves in the opposed rotor ends.

25. In a machine for compressing and pelleting a cut crop comprising means providing a chamber having an arcuate wall, a rotor mounted in said chamber for rotation on an axis fixed relative to said chamber, said rotor axis being eccentric with respect to the center of curvature of said arcuate wall, said wall extending about said rotor and provided with restricted outlets, a crop inlet to said chamber, the periphery of said rotor being adapted to sweep along said wall past said outlets during rotation to press the crop from said chamber through said outlets, the spacing between said wall and the periphery of said rotor being relatively large adjacent the crop inlet and becoming progressively smaller in the direction of rotor rotation.

26. A machine for compressing and pelleting a cut crop comprising means providing a chamber, a rotor mounted in said chamber for rotation about its own axis, said axis of rotation being fixed with respect to said chamber, said chamber having an arcuate wall about said rotor provided with restricted outlets, a crop inlet to said chamber, said rotor having a part immovable with respect thereto provided with a generally circumferentially extending peripheral surface disposed closely adjacent to said arcuate wall, means for rotating said rotor about its axis relative to said arcuate wall to cause said peripheral surface to rub along said wall past said outlets and to press the crop from said chamber through said outlets, said peripheral surface having a plurality of circumferentially spaced tooth-like formations providing serrations which closely approach said wall of said chamber to shred the crop as it is rubbed and compressed by the relative movement of said peripheral surface.

References Cited by the Examiner

UNITED STATES PATENTS

| | | | |
|---|---|---|---|
| 2,063,404 | 12/1936 | Selman | 107—8.35 |
| 2,144,055 | 1/1939 | Hall | 107—14 |
| 2,186,415 | 1/1940 | Haworth | 107—8.35 |
| 2,239,220 | 4/1941 | Permentier | 107—8.35 |
| 2,295,743 | 9/1942 | Meakin | 107—8 |
| 2,647,474 | 8/1953 | Popick | 107—14 |
| 2,870,481 | 1/1959 | Bonnafoux | 18—12 |

FOREIGN PATENTS 26,750 1911 Great Britain.

WALTER A. SCHEEL, *Primary Examiner.*

ABRAHAM G. STONE, JOSEPH D. SEERS, CHARLES A. WILLMUTH, *Examiners.*